G. PORTER.
CASING FOR THERMOSTATIC INSTRUMENTS.
APPLICATION FILED AUG. 20, 1906.
1,021,888.
Patented Apr. 2, 1912.
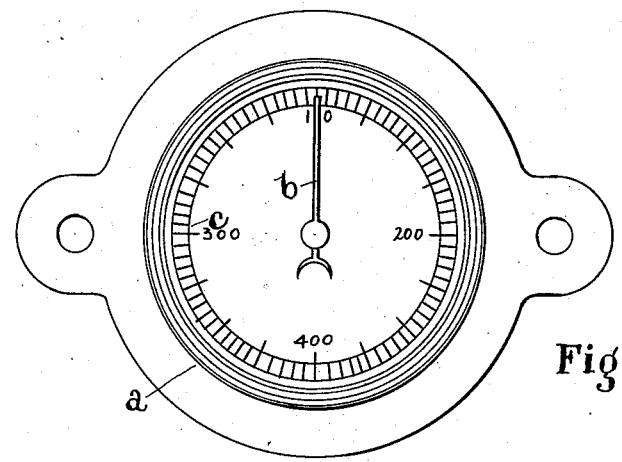
Fig.1.
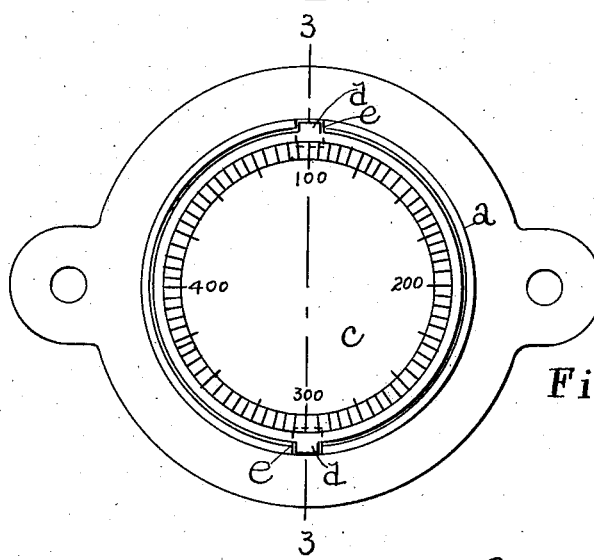
Fig.2.
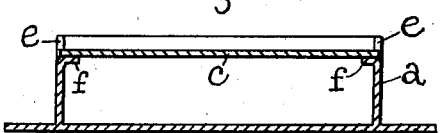
Fig.3.
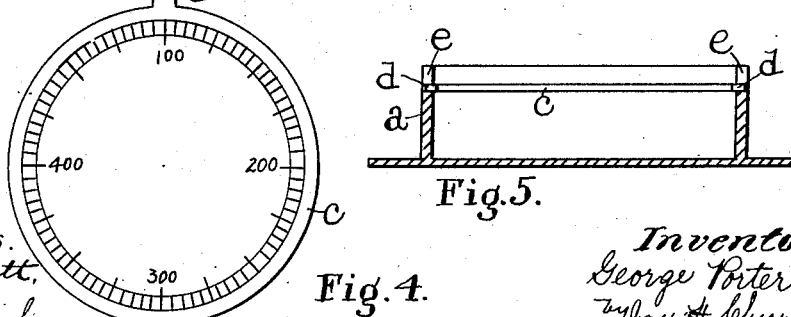
Fig.4.
Fig.5.
Witnesses.
C. H. Garrett,
J. Murphy
Inventor:
George Porter
by Jas. H. Churchill
atty.

UNITED STATES PATENT OFFICE.

GEORGE PORTER, OF BOSTON, MASSACHUSETTS, ASSIGNOR TO PARKER MANUFACTURING COMPANY, OF BOSTON, MASSACHUSETTS, A CORPORATION OF WEST VIRGINIA.

CASING FOR THERMOSTATIC INSTRUMENTS.

1,021,888.

Specification of Letters Patent.

Patented Apr. 2, 1912.

Application filed August 20, 1906. Serial No. 331,259.

*To all whom it may concern:*

Be it known that I, GEORGE PORTER, a citizen of the United States, residing in Boston, in the county of Suffolk and State of Massachusetts, have invented an Improvement in Casings for Thermostatic Instruments, of which the following description, in connection with the accompanying drawings, is a specification, like letters on the drawings representing like parts.

This invention relates to a thermostatic instrument of that class in which a pointer is moved over a dial provided with graduations indicative of degrees of temperature and located within an inclosing casing containing the thermostat and mechanism for connecting the same with the pointer.

In instruments of the class described as now commonly constructed and known to me, the graduated dials are secured to the casing by means of screws or rivets, which method of securing the dial is expensive and requires time in assembling the instrument, thereby materially adding to the cost of the same.

The present invention has for its object to simplify and cheapen the cost of instruments of the class referred to, and this result is accomplished in accordance with this invention by providing the dial with self-locking means against rotary movement as will be described.

Figure 1 is a plan view of an instrument embodying this invention. Fig. 2, a plan view of the instrument with the glass and its retaining ring removed. Fig. 3, a section on the line 3—3, Fig. 2. Fig. 4, a plan of the dial removed, and Fig. 5, a modification to be referred to.

Referring to the drawings, $a$ represents an inclosing casing for the coöperating parts of the thermostatic instrument, which comprise the pointer $b$, graduated dial $c$, and the thermostat and mechanism connecting the same with the pointer, which thermostat and mechanism are not herein shown as they form no part of the present invention, and may be of the construction now usually employed in instruments of this class. The dial $c$ in accordance with this invention is provided with means for locking it against rotary movement and for this purpose, said dial is provided with one or more outwardly extended lugs or projections $d$, which are integral with the dial and which coöperate with slots or openings $e$ in the body portion of the casing $a$.

In the present instance the dial $c$ is provided with two substantially diametrically opposite lugs $d$, which enter correspondingly located slots $e$ in the body portion and which lugs rest upon inwardly extended lugs or projections $f$ formed by bending down within the body portion $a$ the portions of the latter which are cut or slitted to form the slots $e$, as represented in Fig. 3.

If desired, the portions or lugs $f$ which form the slots $e$ may be entirely removed as represented in Fig. 5, in which case the lugs $d$ on the dial may rest on the bottom wall of the slots $e$ in the body portion of the casing.

By means of the lugs on the dial extended into the slots or openings in the case, the said dial is locked against rotary movement and without the necessity of employing the screws or rivets now commonly employed, and as a result the cost of construction, and the time and labor employed for assembling the parts are materially reduced, thereby enabling the instrument to be manufactured and sold at a minimum price.

Claims:

1. In an instrument of the class referred to, in combination, a dial, an inclosing casing for said dial comprising a bottom having outwardly extended lugs provided with openings and a circular body portion open at its top and provided with a slot or opening at the upper edge thereof, and a lug or projection on said dial extended outwardly from said dial in the plane of the latter and into said opening to rest upon the bottom wall of said slot and support the dial above the bottom of the casing and lock it against rotary movement, substantially as described.

2. In an instrument of the class referred to, in combination, a pointer, a dial with which said pointer coöperates, an inclosing casing having a plurality of slots or openings in its body portion at the edge thereof and lugs or projections extended within the casing in line with said openings, and lugs or projections on said dial extended outwardly from said dial and into said openings and resting on the lugs of the said body portion, substantially as described.

In testimony whereof, I have signed my name to this specification in the presence of two subscribing witnesses.

GEORGE PORTER.

Witnesses:
M. E. HUNT,
M. M. BLODGETT.

Copies of this patent may be obtained for five cents each, by addressing the "Commissioner of Patents, Washington, D. C."